UNITED STATES PATENT OFFICE.

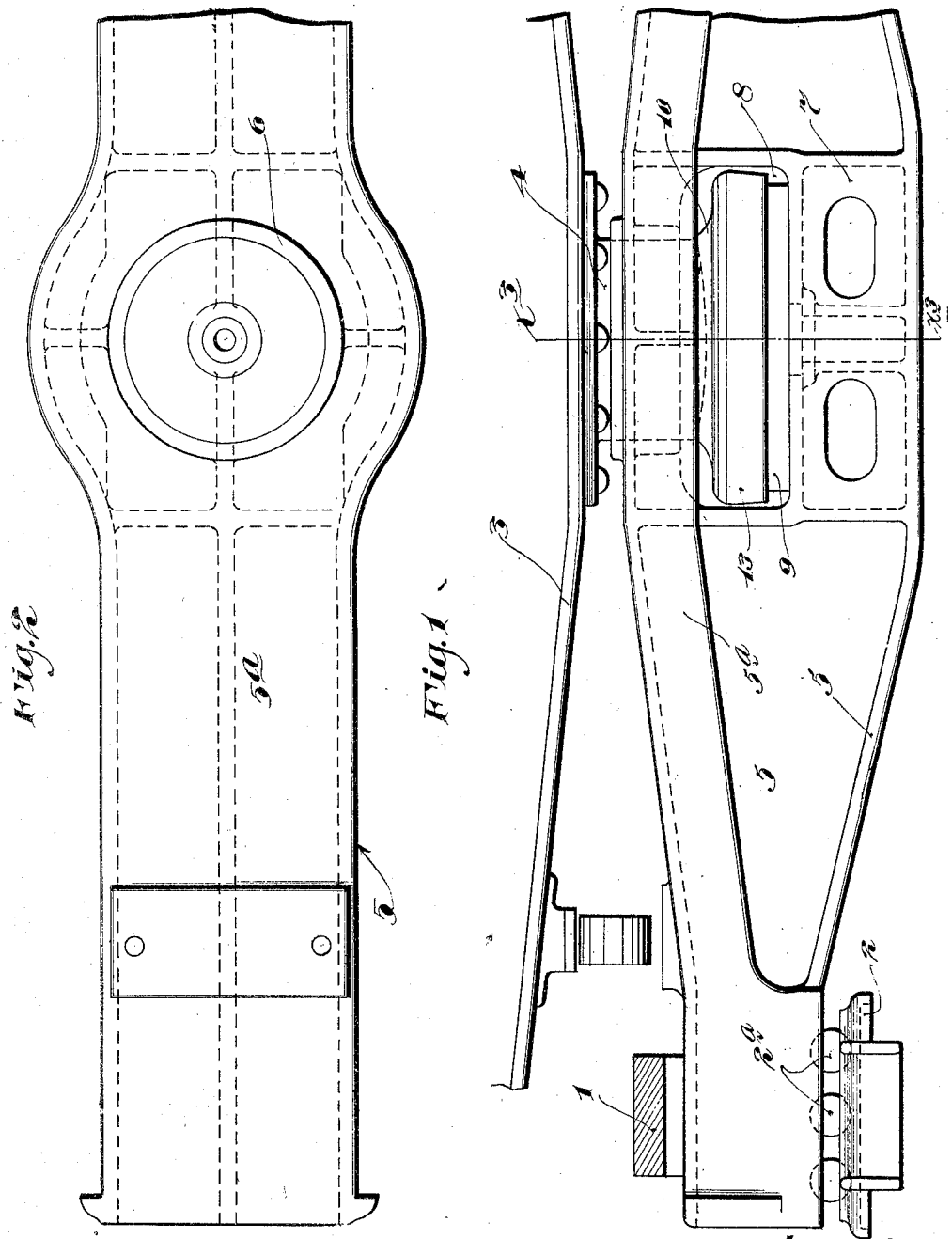

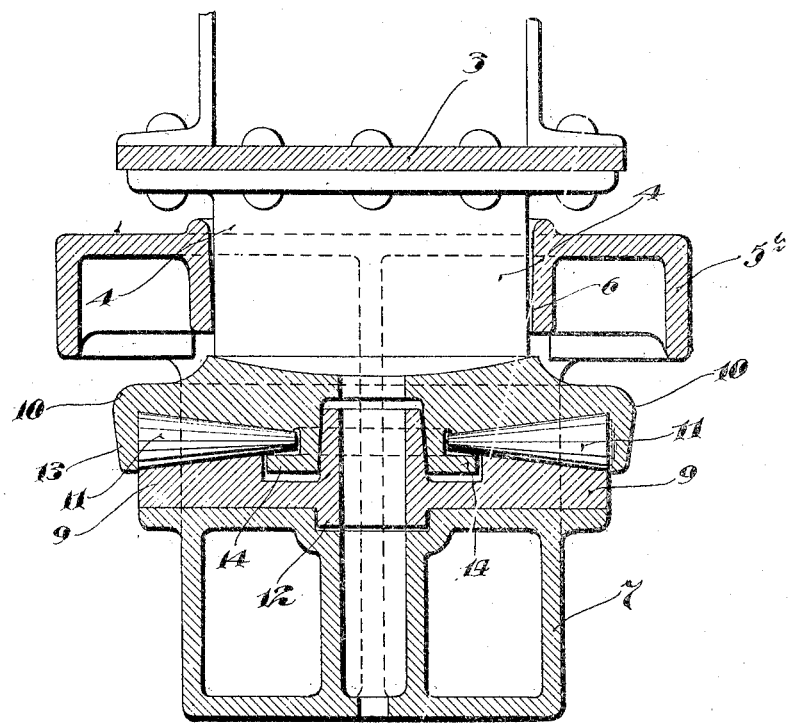

FRANKLIN L. BARBER AND EDWIN W. WEBB, OF CHICAGO, ILLINOIS, ASSIGNORS TO STANDARD CAR TRUCK COMPANY, OF CHICAGO, ILLINOIS, A CORPORATION OF NEW JERSEY.

CAR-TRUCK.

1,039,883.  Specification of Letters Patent.  Patented Oct. 1, 1912.

Application filed February 5, 1912. Serial No. 675,602.

*To all whom it may concern:*

Be it known that we, FRANKLIN L. BARBER and EDWIN W. WEBB, citizens of the United States, residing at Chicago, in the county of Cook and State of Illinois, have invented certain new and useful Improvements in Car-Trucks; and we do hereby declare the following to be a full, clear, and exact description of the invention, such as will enable others skilled in the art to which it appertains to make and use the same.

Our invention relates to car trucks, and is particularly directed to the provision of an improved truck bolster having a center bearing located approximately at its neutral axis whereby various improved results, hereinafter set forth, are obtained.

Generally stated, the invention consists of the novel devices and combinations of devices hereinafter described and defined in the claims.

It is a well known fact that in car structures wherein the truck bolster carries its load through a center bearing, the top member or part of the said truck bolster acts in compression, while the bottom member or portion of said bolster acts in tension. Also, it is a known fact that there is a point in the bolster between its compression and tension members where the force or strain is neutralized and acts neither in compression nor in tension. This point is located on what is generally designated as a neutral axis of the bolster. The chief feature of our invention resides in locating the center bearing below the top or compression member or portion and above the bottom or tension member or portion of the bolster and approximately at the neutral axis of the bolster. This novel arrangement or location of the center bearing in the bolster has several very important results or advantages. The center bearing is placed where it does not take up space between the truck bolster and the body bolster, and thus permits the use of a truck bolster of greater depth at its central portion, without raising the truck bolster or the body of the car. In fact, the space between the truck and body bolsters may be reduced and the truck bolster and car body may be brought lower down than with the arrangements of center bearings hitherto provided. Also, the above novel arrangement of the center bearing permits the use of a large deep hub on the body bolster which, in working through the top or compression member of the truck bolster, takes the lateral thrusts, and when a roller or other anti-friction bearing is employed, relieves the same from such lateral strains.

In the accompanying drawings which illustrate the invention, like characters indicate like parts throughout the several views.

Referring to the drawings, Figure 1 is a view chiefly in elevation, but with some parts sectioned and with some parts broken away, showing a portion of a car truck, a truck bolster and body bolster having a center bearing applied in accordance with our invention; Fig. 2 is a plan view of the truck bolster, some parts being broken away; and Fig. 3 is a transverse vertical section taken on the line $x^3$ $x^3$ on Fig. 1.

The numeral 1 indicates a portion of a truck side frame having a suitably supported roller base or bearing 2 on which lateral motion roller devices $2^a$ are shown as mounted, but which, however, constitute no part of the present invention.

The numeral 3 indicates a body bolster having at its central portion, a large and deep depending centering hub 4, which, at its lower end is formed with a convex spherical bearing surface.

The numeral 5 indicates a truck bolster as an entirety, the same, as shown, being a cast structure having a top compression member $5^a$ and a bottom tension member $5^b$. It should be here stated that so far as this invention is concerned, the truck bolster may take various forms.

At its central portion, the top member $5^a$ of the truck bolster is widened and is formed with a vertical hub seat 6 through which the centering hub 4 of the body bolster 3 is passed. It may be here noted that the walls of this seat flare upwardly so as to permit the centering hub 4 to wabble slightly or to permit the truck bolster to wabble slightly in respect to the said hub.

The lower central portion of the bolster 5 is shown as in the form of a hollow box-like structure 7, and just above this portion 7, the said bolster is formed with a central opening 8, which opening is located on the neutral axis of the said bolster.

In the construction illustrated, I have shown an anti-friction center bearing made up of a lower bearing plate 9, the upper bearing plate 10 and interposed conical rollers 11. The lower bearing plate 9 is seated directly on the box-like structure 7 of the truck bolster 5, and is provided with a depending boss 12 seated in a depression formed in the top of the said parts 7. The rollers 11 engage with conical bearing surfaces of the plates 9 and 10, and the latter is formed with a depending thrust flange 13, against which the outer ends of the rollers engage. Also, as shown, the lower bearing plate 9 is provided with an upwardly projecting hub that works in an axial seat of the upper bearing plate 10; and the said upper bearing plate 10 is also shown as provided with an outwardly projecting lower retaining flange 14 that underlaps the inner ends of the said rollers. On its top, the upper bearing plate 10 is formed with a concave spherical bearing surface with which the spherical bearing surface on the lower end of the centering hub 4 of the body bolster is seated. Obviously, so far as the present invention is concerned, the anti-friction bearing may take any suitable form. The construction is also such that the above noted parts 4, 7, 9 and 10 may have a center pin passed therethrough, if desired, although this is not at all necessary in this improved construction.

By reference to Fig. 3, it will be noted that the concave bearing surface of the upper roller bearing plate 10 is wider or of greater diameter than the corresponding convex surface of the centering hub 4. This permits the truck and the body bolsters to assume slightly different angular relations without effecting the relation of the bearing plates 9 and 10 and without perceptibly shifting the pressure of the weight upon the said upper bearing plate.

The car is securely held on center by the greater depth of the pivot of the centering hub or center pivot 4, and there is no possibility of the body bolster jumping from its seat in the truck bolster. All shocks delivered to the truck through the draw bar will be absorbed by the said centering hub and will not be transmitted to the rollers of the center bearing proper. The roller bearing device needs no rivets to secure it to the truck bolster and may be made of one standard for various heights of cars, the variations being made in the centering hub. The parts of the anti-friction center bearing must be made of finer fit or better workmanship than the parts of the bolster, and as they are entirely detachable from the truck bolster, this is made a simple and easy matter.

From inspection of Fig. 3, it is obvious that the parts of the center bearing proper may be inserted in working position in the truck bolster or removed therefrom, by movements through the open sides of the central opening 8.

What we claim is:

1. A truck bolster having a center bearing made up of upper and lower bearing plates and interposed rollers, the said center bearing being applied to said bolster between the top or compression and the bottom or tension members thereof.

2. A truck bolster having a center bearing made up of upper and lower bearing plates and interposed rollers, the said center bearing being applied to said bolster with the axes of said rollers located approximately in the horizontal plane of the neutral axis of said truck bolster.

3. A truck bolster having a center bearing made up of coöperating upper and lower bearing plates and interposed rollers, said center bearing being located between the top and bottom members of said bolster, in combination with a body bolster having a depending centering hub depending through a vertical passage in the top member of said truck bolster and resting on the upper bearing plate of said center bearing.

4. A truck bolster having a center bearing made up of coöperating upper and lower bearing plates and interposed rollers, said center bearing being located between the top and bottom members of said bolster, in combination with a body bolster having a depending centering hub depending through a vertical passage in the top member of said truck bolster and resting on the upper bearing plate of said center bearing, the engaging surface of said centering hub and upper bearing plate being spherical and the said centering hub being capable of a slight wabbling movement in respect to said truck bolster.

In testimony whereof we affix our signatures in presence of two witnesses.

FRANKLIN L. BARBER.
EDWIN W. WEBB.

Witnesses:
Leo W. Barber,
E. E. Silk.